United States Patent
Boucher

(10) Patent No.: US 6,201,958 B1
(45) Date of Patent: *Mar. 13, 2001

(54) TELECOMMUNICATIONS SYSTEM, MOBILE TERMINAL AND METHOD OF REGISTRATION OF A TERMINAL WITH A TELECOMMUNICATIONS NETWORK

(75) Inventor: Pierre-Hugues Boucher, St. Avertin (FR)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,682

(22) Filed: Mar. 25, 1998

(30) Foreign Application Priority Data

Apr. 2, 1997  (FR) .................................................. 97 04001

(51) Int. Cl.[7] .................................................. H04M 1/66
(52) U.S. Cl. .................... 455/411; 455/410; 340/825.34; 380/23
(58) Field of Search .................... 455/410, 411, 455/435, 575, 409; 380/43, 48, 23, 49; 340/825.34; 379/114

(56) References Cited

U.S. PATENT DOCUMENTS

| 5,077,790 | 12/1991 | D'Amico et al. .................... 380/23 |
|---|---|---|
| 5,179,373 | 1/1993 | John ..................................... 340/825 |
| 5,511,114 | * 4/1996 | Stimson et al. ........................ 379/114 |
| 5,553,315 | * 9/1996 | Sobti et al. ........................... 455/411 |
| 5,572,193 | * 11/1996 | Flanders et al. ................ 340/825.34 |
| 5,596,641 | * 1/1997 | Ohashi et al. .......................... 380/23 |
| 5,613,214 | * 3/1997 | Shirasawa et al. ................... 455/411 |
| 5,642,401 | * 6/1997 | Yahagi ................................... 380/23 |
| 5,689,563 | * 11/1997 | Brown et al. .......................... 380/49 |
| 5,818,915 | * 10/1998 | Hayes, Jr. et al. .................... 379/114 |
| 5,878,340 | * 3/1999 | Asaoka et al. ........................ 455/575 |
| 5,907,804 | * 5/1999 | Schroderus et al. .................. 455/411 |

OTHER PUBLICATIONS

"The Complete Solution for Cordless Access" Philips Telecommunication Review, vol. 52, No. 3. Jan. 1995.

* cited by examiner

*Primary Examiner*—Nay Maung
*Assistant Examiner*—Quochien B. Vuong
(74) *Attorney, Agent, or Firm*—Dicran Halajian

(57) ABSTRACT

The invention relates to a telecommunications network comprising at least a radio base station and a mobile terminal suitable for sending a secret authentication code to the radio station for making itself known to said network. The invention notably provides a registration procedure for the various terminals with base radio stations to enable the network to facilitate subscriber management. For this purpose, a period of time is allocated to the secret authentication code, so that the registration of a terminal results in the fact that said secret code is supplied at a date lying in said period of time.

6 Claims, 2 Drawing Sheets

TELECOMMUNICATIONS SYSTEM, MOBILE TERMINAL AND METHOD OF REGISTRATION OF A TERMINAL WITH A TELECOMMUNICATIONS NETWORK

FIELD OF THE INVENTION

The invention relates to a telecommunications system comprising at least a fixed part and a mobile terminal suitable for supplying the fixed part with a secret authentication code for being registered with said system.

The invention likewise relates to a mobile telephone terminal to be registered with a telecommunications network via a secret authentication code fed to a fixed part of said network.

The invention finally relates to a method of registration, via a secret authentication code, of a mobile terminal with a telecommunications network comprising at least one radio base station.

The invention has interesting applications in the field of mobile radio telecommunications, notably in the scope of the DECT standard (Digital Enhanced Cordless Telecommunications). The invention provides means for making the management of the various users of a mobile telephone network easier, for example, by facilitating their registration with a radio base station during a subscription to a network or to a particular service of a network.

BACKGROUND OF THE INVENTION

U.S. Pat. No. 5,077,790 describes a method for registration of a portable terminal in a cordless telephone network that comprises a network controller, having a data base that contains the identification numbers of the known portable terminals of the network. The portable terminal communicates to a base station of the network a request for registration, which request contains the identification number of the portable terminal. The network controller favorably responds to the previous request if the identification number is found in the network controller database.

This method for registration of the terminals of a network by comparing a number with, in succession, all the numbers contained in a database is hard to implement and manage.

SUMMARY OF THE INVENTION

It is an object of the invention to largely cope with this difficulty and provide simple means which are easy to implement and maintain, for managing the identification of the various users of a mobile telephone network, for example, during their subscription to the network or to a particular service of this network.

Therefore, a telecommunications system, a portable terminal and a method for registration of a terminal in a telecommunications network as defined in the opening paragraph are characterized in that at least a period of time is allocated to the secret code, so that said registration results in the supply of said code at a date that depends on said period of time.

According to an advantageous embodiment of the invention, during a period of time there is a unique authentication code coupled to this period of time, which code is valid for all the users invited to be subscribed in this period of time. Just like the secret authentication code, this period of time may be discretely communicated (for example, by mail or orally) to the user of the portable terminal who notably desires to be subscribed to the network so that his secret code is formed by, for example, a date lying in this period of time. Thus, the network controller only needs to verify that the code sent to a radio base station of the network at a given instant (or date) is equal to the code required at that instant.

Furthermore, the invention has the advantage of presenting a perfect compatibility with the mobile telephony standard DECT. Indeed, when said system, said portable terminal and said registration method as defined above are compatible with the recommendation ETSI 300175-5 (called DECT standard in the following of the description), they are characterized in that the secret code is used as an AC (authentication code) in the procedure called Key allocation defined in said standard, paragraph 13.6 of the second edition dated January 1995.

Another object of the invention is to provide means for managing users notably of a telephone network to avoid that a network controller verifies in a database that the authentication code, for example, manually produced by the user corresponds well to that allocated to the number of his equipment (serial number of the mobile terminal) automatically fed to the base station while the request is being registered.

Therefore, a telecommunications system, a mobile terminal and a registration method as they have already been defined, while the terminal has an identification number or a serial number notably an IPEI (International Portable Equipment Identity) according to the DECT standard, are characterized in that said secret code is independent of the IPEI of the terminal.

These and other aspects of the invention will be apparent from and elucidated with reference to the embodiments described hereinafter.

DETAILED DESCRIPTION OF THE INVENTION

Various embodiments of the invention will now be described within the scope of the DECT mobile telephony standards defined by ETSI (European Telecommunications Standard Institute). The invention, however, is applicable to any other telecommunications system having a user authentication procedure while the users are registered with a network (CT2, ETACS, TETRA, GSM etc.), notably, for making a subscription.

Figure 1:
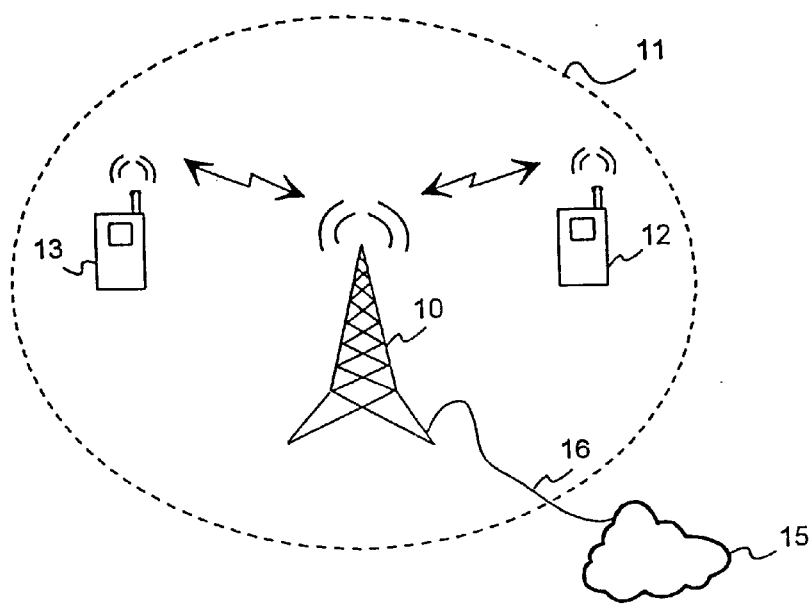
FIG. 1 represents an example of a telecommunications system according to the invention.

The system of FIG. 1 comprises a radio base station 10 having a coverage area 11 inside which two portable terminals 12 and 13 may be displaced while being in radio connection with the base station 10. The latter is connected to a public switched telephone network 15 by a cable 16.

Other examples of telecommunications systems are described in the article: "The complete solution for cordless access" published in Philips Telecommunication Review, vol. 52, no. 3, January 1995.

The invention notably relates to a procedure of registration of mobile radio terminals with a telecommunications network. During the first registration of a terminal by a base station, for example, after the terminal has been purchased and an operator of the mobile terminal has taken out a subscription, the user is to prove his identity by communicating an authentication message to the base station.

The DECT standard provides a procedure called Key allocation for authenticating a user when he registers with a network for the first time. On the other hand, each mobile telephone operator is to define with the manufacturers of the portable telephones a calculation method for calculating secret authentication codes of the subscribers and also a method of managing the databases containing these codes.

Figure 2:
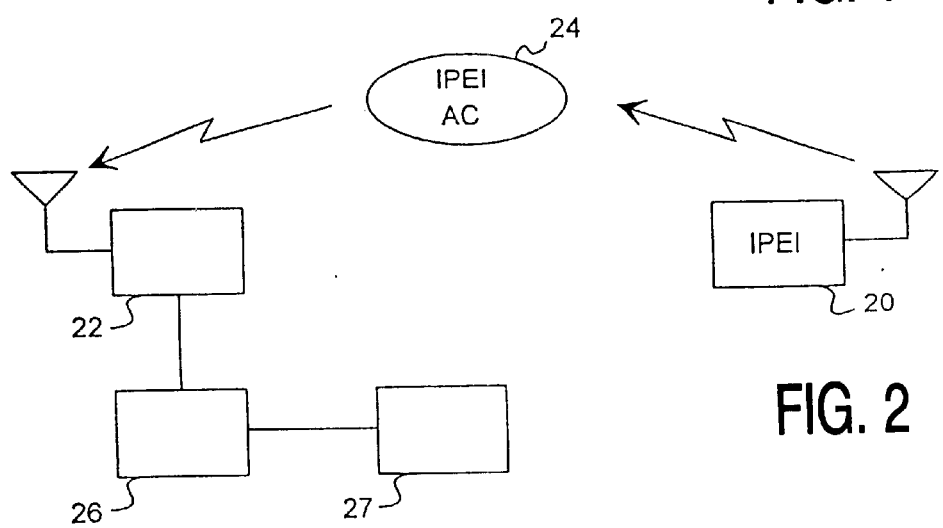
FIG. 2 is a diagram illustrating a known method for registration of a mobile terminal in a cordless telephone network.

A known subscription method for subscribing a mobile terminal to a telecommunications network is shown diagrammatically in FIG. 2. Each mobile terminal 20 possesses a unique identification number comparable to a serial number called IPEI in the DECT standard. The base station 22 receives a registration request 24 from the side of the terminal 20. This request supplies the IPEI number to the base station 22 which number is intended to identify the mobile terminal (notably for verifying that not a stolen terminal is concerned) and a secret code AC intended to identify the subscribed user.

A control unit 26 verifies in a data base 27 which contains the list of all the AC codes of the subscribers as well as the corresponding IPEI numbers, whether the supplied code AC is found in the list allocated to the received IPEI. If this is the case, the base station 22 could proceed to the registration of the terminal 20.

This registration procedure implies that a long list of numbers is managed and numerous comparison tests are carried out because of the dependence between the AC and EPI of the portable terminal. For making this procedure simpler and avoiding multiple accesses to the data base of the network, a solution consists of rendering the AC independent of the IPEI according to an original method allocating a period of time to the code AC.

Figure 3:
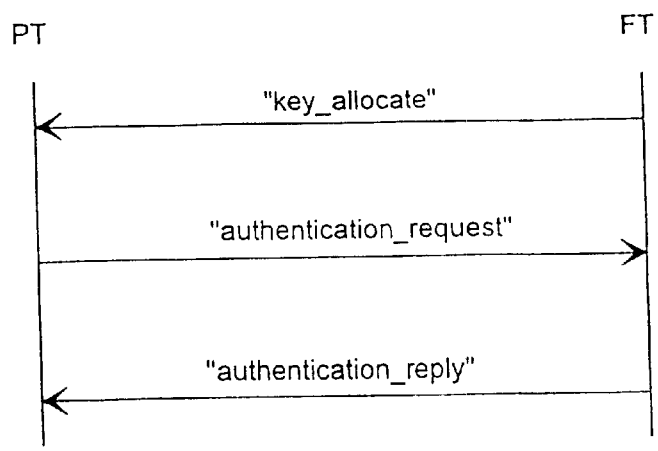
FIG. 3 is a diagram illustrating the invention applied to the procedure called Key allocation defined in the DECT standard and FIG. 4 is a flow chart of an example of a registration method according to the invention.

FIG. 3 gives a diagrammatic representation of a step of the subscription procedure according to the invention of a mobile terminal PT to a telecommunications network via a radio base station FT, while this step is carried out by the procedure called Key allocation defined in the DECT standard.

The FT sends to the PT a message of the "key_allocate" type containing, inter alia, the number (or type) of the AC to be used. Indeed, according to the respective networks or the subscription, there is an allocated type of AC. The PT responds to FT via a request of the "authentication_request" type containing a calculation result RES1 obtained on the basis of its AC: $AC_1$. Upon reception of the "authentication_request" message, the FT performs the same calculation as the PT while utilizing the AC waited for, $AC_2$, and obtains a result XRES1. The authentication of the PT is realized if RES1=XRES1. Next, the PT in its turn authenticates the FT. Therefore, the FT sends to the PT a message of the "authentication_reply" type containing a calculation result RES2. Upon reception of this message, the PT performs the same calculation and obtains a result XRES2. The authentication of the FT is realized if RES2=XRES2.

The authentication results RES1, XRES1, RES2 and XRES2 are calculated in conformity with the recommendation ETSI 300175-7. The code AC is combined with other data generated at random before being applied to a calculation unit of an authentication algorithm called DSAA (DECT Standard Authentication Algorithm) for yielding the calculation results mentioned above.

According to the preferred embodiment of the invention, the code AC allocated to a period of time is intended to be communicated to the base station at an instant (or date) lying in said period of time. This is to be sufficiently long to permit a user to carry out the subscription procedure.

Thus, the code $AC_2$ waited for by the base station and used for calculating XRES1 and RES2 corresponds to the current code AC which is valid for all the users invited to subscribe at a date lying in the period of time during which the present procedure takes place.

If the double authentication between the PT and the FT is validated, the network controller concludes that $AC_1=AC_2$ and thus that the produced code is the one waited for. The registration of the portable terminal could thus be accepted. If not, it will be refused.

Figure 4:
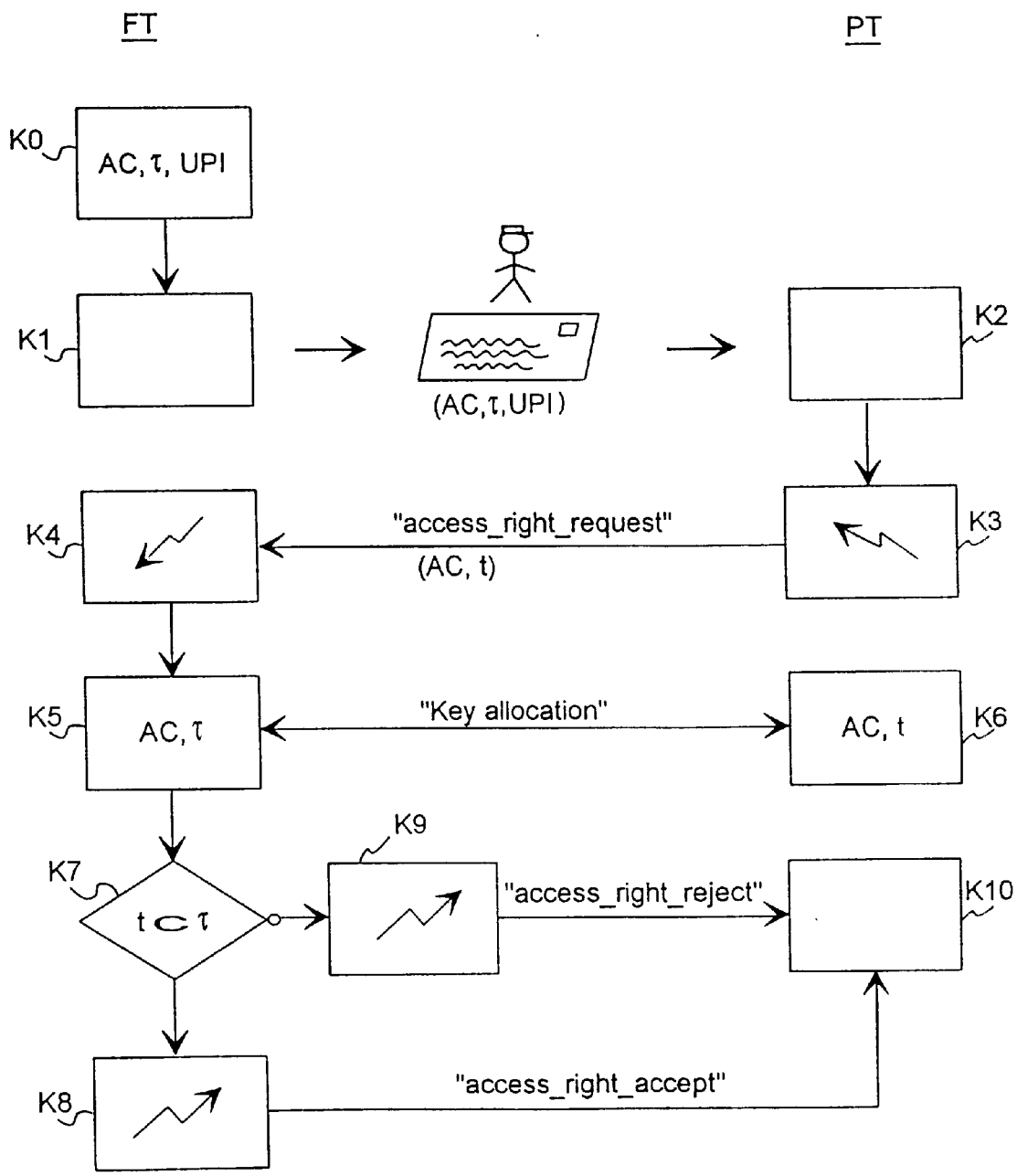

The flow chart of FIG. 4 describes the complete subscription method of a mobile terminal to a telecommunications network in conformity with the DECT standard according to the preferred embodiment of the invention:

in box K0, the base station FT determines the AC, its allocated period of time τ and a User Personal Identity UPI which will be used as a parameter in a great number of messages, in box K1, the data determined previously are addressed to the user of the mobile terminal PT in the form of E-mail, fax or regular mail, in box K2, the PT receives the E-mail containing its AC and its UPI, in box K3, the PT prepares a subscription request which it transmits by radio to the base station FT in a message of the type "access_right_request" containing, inter alia, its AC, in box K4, the base FT receives the subscription request from the terminal and registers the reception date t of the message (possibly with a precision of one second), in boxes K5 and K6, the mobile terminal and the base station exchange the various messages of the procedure of the type Key allocation; more particularly, there is verified that the produced code AC is the one required for the registered date of reception t, in box K7, ($t \subset \tau$), the result of the preceding step is tested; if t is included in the period of time τ assigned to the produced code AC, the result is positive and the method continues to box K8, if not it proceeds to box K9, in box K8, the result being positive, the base station accepts the subscription of the mobile terminal by sending thereto a message of the type "access_right_accept", in box K9, the results being negative, the base station rejects the subscription of the mobile terminal by sending thereto a message of the type "access_right_reject", in box K10, the subscription procedure is terminated.

The invention is not restricted to the embodiments described by way of examples. Variants will be apparent to the man or woman skilled in the art, more particularly, as regards the method of determining user authentication codes (AC) and allocated periods of time. Indeed, the same code could be allocated to various periods of time on the same day or on certain days; the essence being that the probability of the user by accident dialling the right code AC in the right period of time is sufficiently remote. For example, there may be provided random calculation methods for allocating codes to periods of time, while these variants of embodiments are still within the scope of the invention.

What is claimed is:

1. A telecommunications system comprising at least a fixed part and a plurality of mobile terminals suitable for supplying the fixed part with a secret authentication code for registration with said telecommunications system, wherein at least a period of time is allocated to the secret authentication code so that said registration is accepted when a reception date of said secret authentication code is within said period of time, said secret authentication code being valid for all of said plurality of mobile terminals invited to be registered during said period of time.

2. A system as claimed in claim 1, wherein each of said plurality of mobile terminals has an identification number, and wherein said secret authentication code is independent of said identification number.

3. A mobile telephone for communicating with at least a plurality of mobile terminals and for registration with a telecommunications network via a secret authentication code provided by said mobile telephone to a fixed part of said telecommunications network, wherein a period of time is allocated to the secret authentication code so that said registration is accepted when a reception date of said secret authentication code is within said period to time, said secret authentication code being valid for all different ones of said plurality of mobile terminals invited to be registered during said period of time.

4. A mobile telephone as claimed in claim 3, having a unique identification number which is different for each of said different ones of said plurality of mobile terminals, wherein said secret authentication code of said different ones of said plurality of mobile terminals is independent of said identification number.

5. A method for registering a plurality of mobile terminals with a telecommunications system having at least a radio base station comprising:

providing said plurality of mobile terminals with a secret authentication code;

allocating a period of time to said secret authentication code;

supplying from one of said plurality of mobile terminals to said at least a radio base station said secret authentication code for registration with said telecommunications system;

accepting said registration when a reception date of said secret authentication code is within said period of time, said secret authentication code being valid for all of said plurality of mobile terminals invited to be registered during said period of time.

6. The method of claim 5, further comprising providing said one of said plurality of mobile terminals with an identification number, wherein said secret authentication code of said plurality of mobile terminals is independent of said identification number.

* * * * *